(12) United States Patent
Shinozaki

(10) Patent No.: US 7,916,331 B2
(45) Date of Patent: Mar. 29, 2011

(54) IMAGE READING DEVICE AND COMPUTER PROGRAM PRODUCT

(75) Inventor: Takashi Shinozaki, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 992 days.

(21) Appl. No.: 11/711,716

(22) Filed: Feb. 28, 2007

(65) Prior Publication Data

US 2007/0206236 A1    Sep. 6, 2007

(30) Foreign Application Priority Data

Mar. 2, 2006 (JP) .................................. 2006-056740

(51) Int. Cl.
*H04N 1/04* (2006.01)
(52) U.S. Cl. ....... 358/1.15; 358/403; 358/503; 358/1.18
(58) Field of Classification Search .................. 358/1.15, 358/403, 505, 1.18, 402
See application file for complete search history.

(56) References Cited

U.S. PATENT DOCUMENTS 7,502,555 B2 * 3/2009 Ogino ............................. 396/56
7,697,154 B2 * 4/2010 Ohue ........................... 358/1.15

FOREIGN PATENT DOCUMENTS

JP           05-145714         6/1993

* cited by examiner

*Primary Examiner* — Houshang Safaipour
(74) *Attorney, Agent, or Firm* — Harness, Dickey & Pierce, P.L.C.

(57) ABSTRACT

A reading unit reads image data from an image. An information processing terminal is connected to the reading unit. The information processing terminal includes a read control unit that controls the reading unit. The reading unit transmits the image data to the information processing terminal. The information processing terminal combines a user name set in advance by a user with the image on the read control unit, and transfers the image combined with the user name to a display unit to display the image.

15 Claims, 16 Drawing Sheets

FIG.3
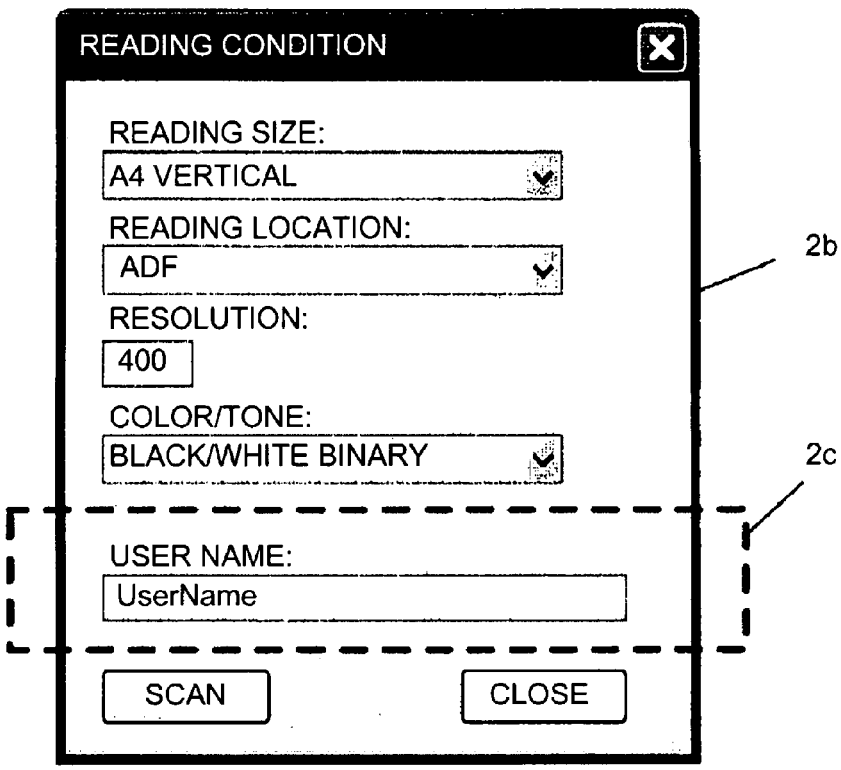
FIG.4A
FIG.4B
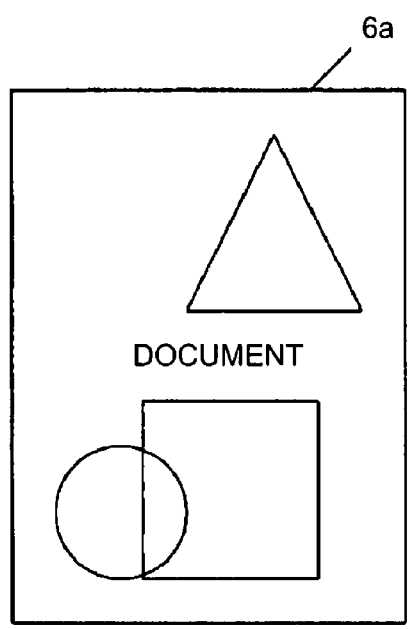
ORIGINAL DOCUMENT
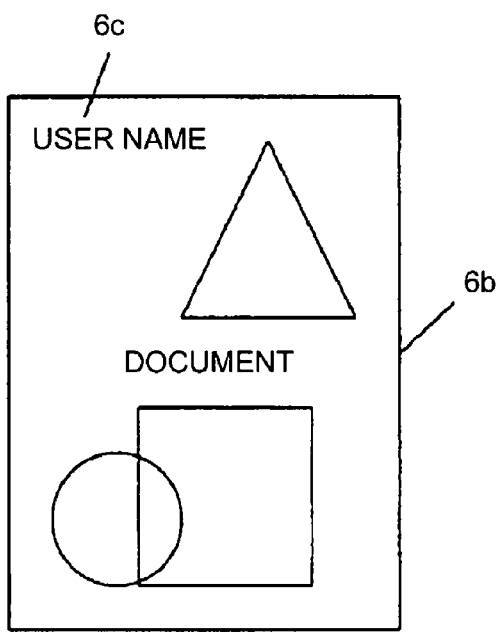
SCAN IMAGE

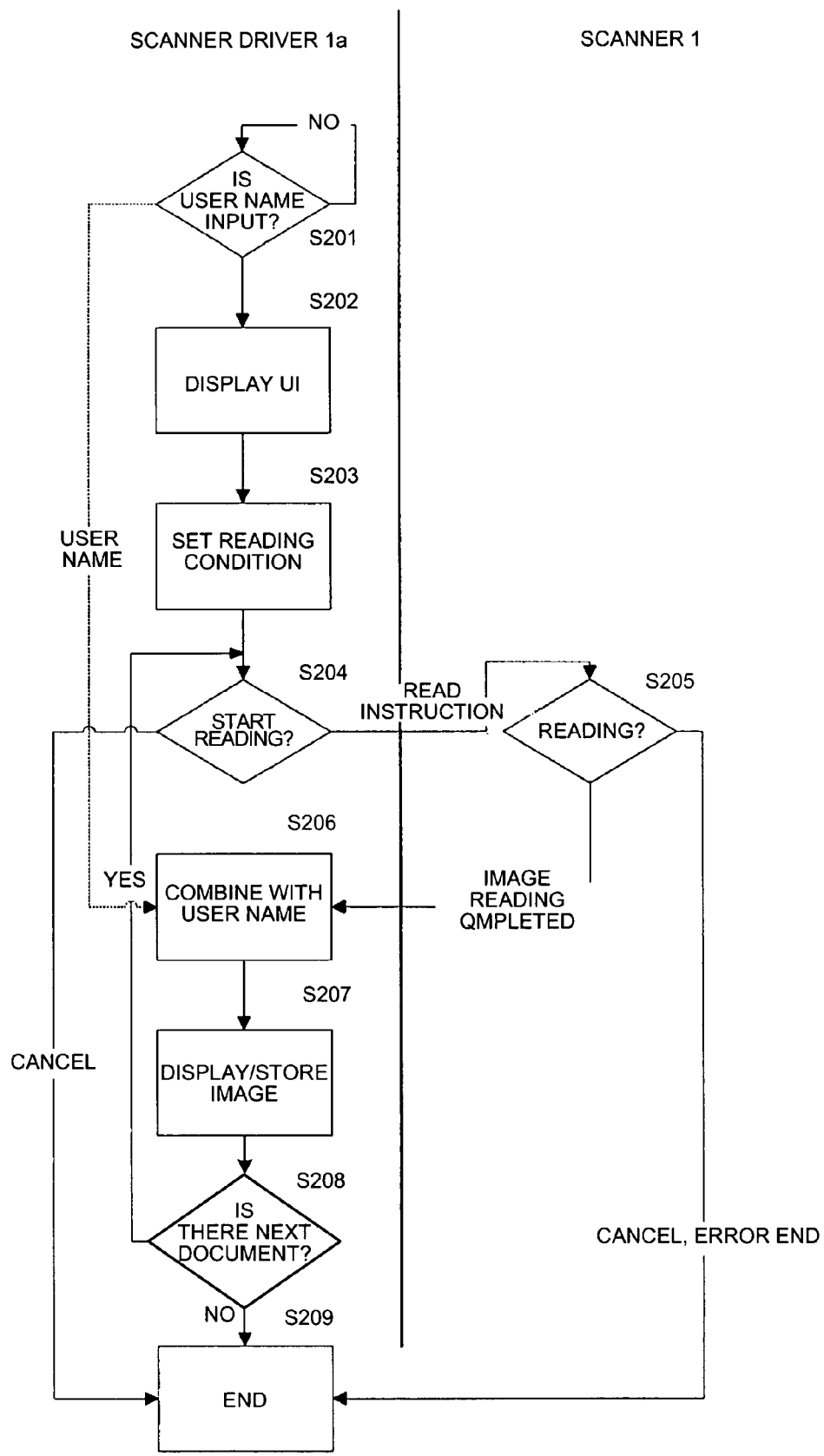

ORIGINAL DOCUMENT

SCAN IMAGE

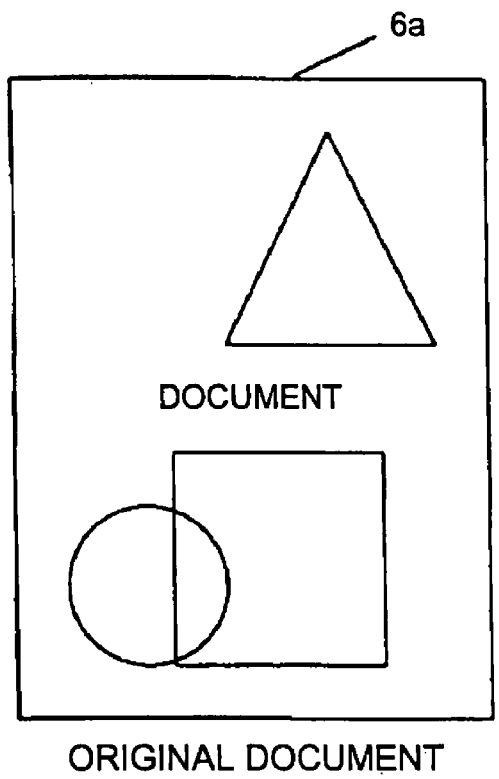 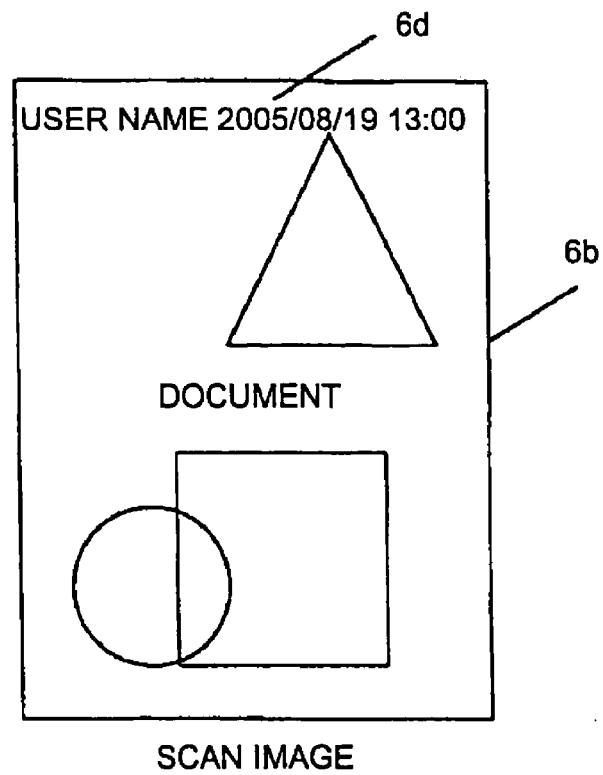
FIG.10A ORIGINAL DOCUMENT
FIG.10B SCAN IMAGE

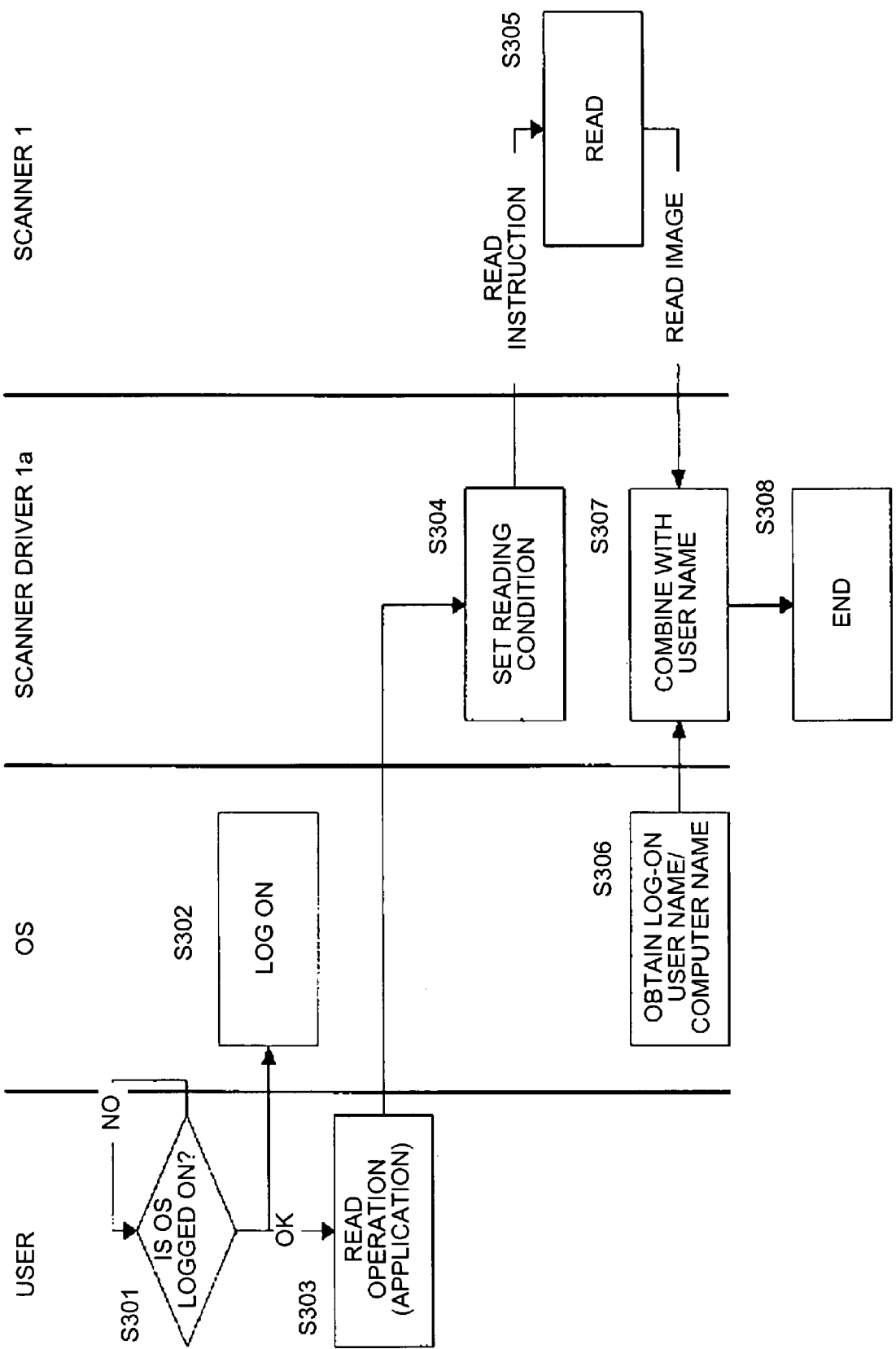

ORIGINAL DOCUMENT

SCAN IMAGE

ORIGINAL DOCUMENT
(AFTER READING)

ORIGINAL DOCUMENT

SCAN IMAGE

ORIGINAL DOCUMENT
(AFTER READING)

IMAGE READING DEVICE AND COMPUTER PROGRAM PRODUCT

CROSS-REFERENCE TO RELATED APPLICATIONS

The present document incorporates by reference the entire contents of Japanese priority document, 2006-056740 filed in Japan on Mar. 2, 2006.

BACKGROUND OF THE INVENTION

1. Field of the Invention

The present invention relates to a technology for reading an image with a capability of determining a user who read a document.

2. Description of the Related Art

When a user reads a document and prepares an image file by using a scanner, some means can inform a date and time when the file is prepared based on the file preparation time. However, these means cannot inform who has read the document. Japanese Patent Application Laid-open No. H5-145714 discloses a technique that makes it possible to selectively print symbols or characters to confirm a reading of the document on both the front side and the back side of the document. According to this conventional technique, fixing units that fixedly hold printing units are provided at both sides of the document to sandwich the document so as to detachably hold the printing units at a printable position on the front side and at a printable position on the back side of the document, respectively.

Nowadays, read image data are held as files on a personal computer or a server in many cases. On the other hand, according to the invention described in Japanese Patent Application Laid-open No. H5-145714, the read image data cannot be distinguished as a file because symbols or characters are printed on the document. When the read image data is stored as a file, it becomes difficult to determine who has read the document when the file is stored in a personal computer or a server used by many users.

SUMMARY OF THE INVENTION

It is an object of the present invention to at least partially solve the problems in the conventional technology.

An image reading device according to one aspect of the present invention includes a reading unit that reads image data from an image; and an information processing terminal that is connected to the reading unit, which includes a read control unit that controls the reading unit. The reading unit transmits the image data to the information processing terminal. The information processing terminal combines a user name set in advance by a user with the image on the read control unit, and transfers the image combined with the user name to a display unit to display the image.

A computer program product according to another aspect of the present invention includes a computer-usable medium having computer-readable program codes embodied in the medium that when executed cause a computer to execute setting a reading condition for reading a document; inputting a user name; causing a reading unit to start reading the document when the user name is input; combining the user name with a read image of the document transferred from the reading unit; and displaying an image combined with the user name at the combining.

A computer program product according to still another aspect of the present invention includes a computer-usable medium having computer-readable program codes embodied in the medium that when executed cause a computer to execute inputting a user name; setting a reading condition for reading a document; causing a reading unit to start reading the document; combining the user name with a read image of the document transferred from the reading unit; and displaying an image combined with the user name at the combining.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is one example of a setting screen on a display device of a user PC;

FIGS. 4A and 4B depict a result of a process performed based on the flowchart shown in FIG. 2;

FIG. 5 is a flowchart of a process procedure of a second embodiment of the present invention;

FIG. 11 is a flowchart of a process procedure of a scanner, an OS, a scanner driver, and scanner hardware according to a sixth embodiment of the present invention;

DETAILED DESCRIPTION OF THE PREFERRED EMBODIMENTS

Exemplary embodiments of the present invention will be explained below in detail with reference to the accompanying drawings.

Figure 1:
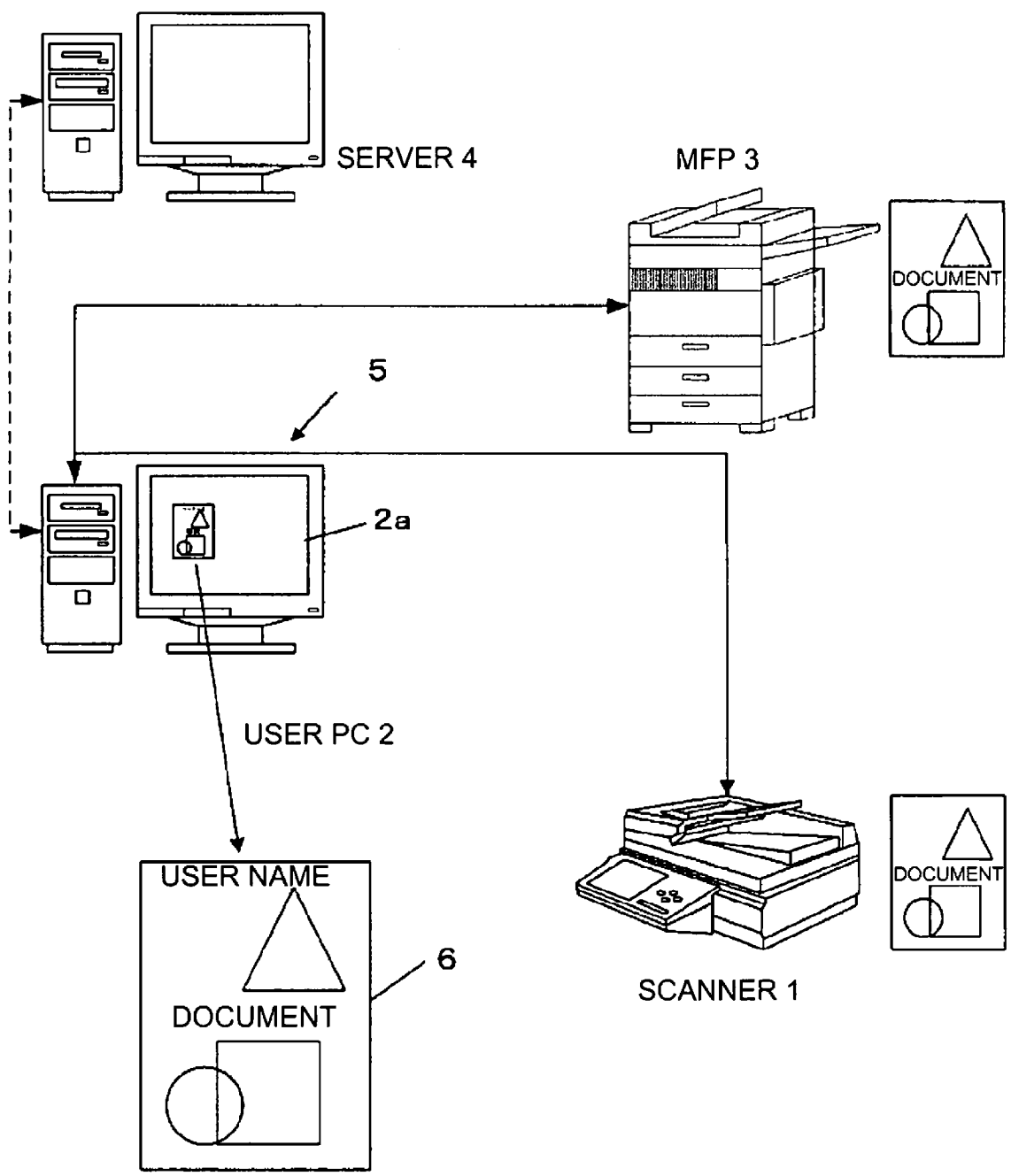
FIG. 1 is a system configuration diagram of an image reading system according to a first embodiment of the present invention.

FIG. 1 is a system configuration diagram of an image reading system according to a first embodiment of the present invention. The image reading system according to the first embodiment includes a scanner 1 as a stand-alone reading unit, a user personal computer (PC) 2 as an information processing terminal connected to the scanner 1, and a multi-function product (MFP) 3 connected to the PC 2. The PC 2 is connected to a server 4 according to need. Usually, a document is placed on a document reading unit of the MFP 3 or the scanner 1. When a user reads an image from the PC 2, a display device 2a of the PC 2 displays the read image of the document. The read image (displayed image) is stored in a file when necessary.

In this case, a user can know when the image has been read, from a file preparation time recorded on the read image. However, the user cannot figure out who has read the image. It is not possible to know who has read the image, particularly when the server 4 is disposed in a network 5, and when each user stores the read image into the server 4, or when the PC 2 connected to the scanner 1 is shared by plural persons.

Figure 2:
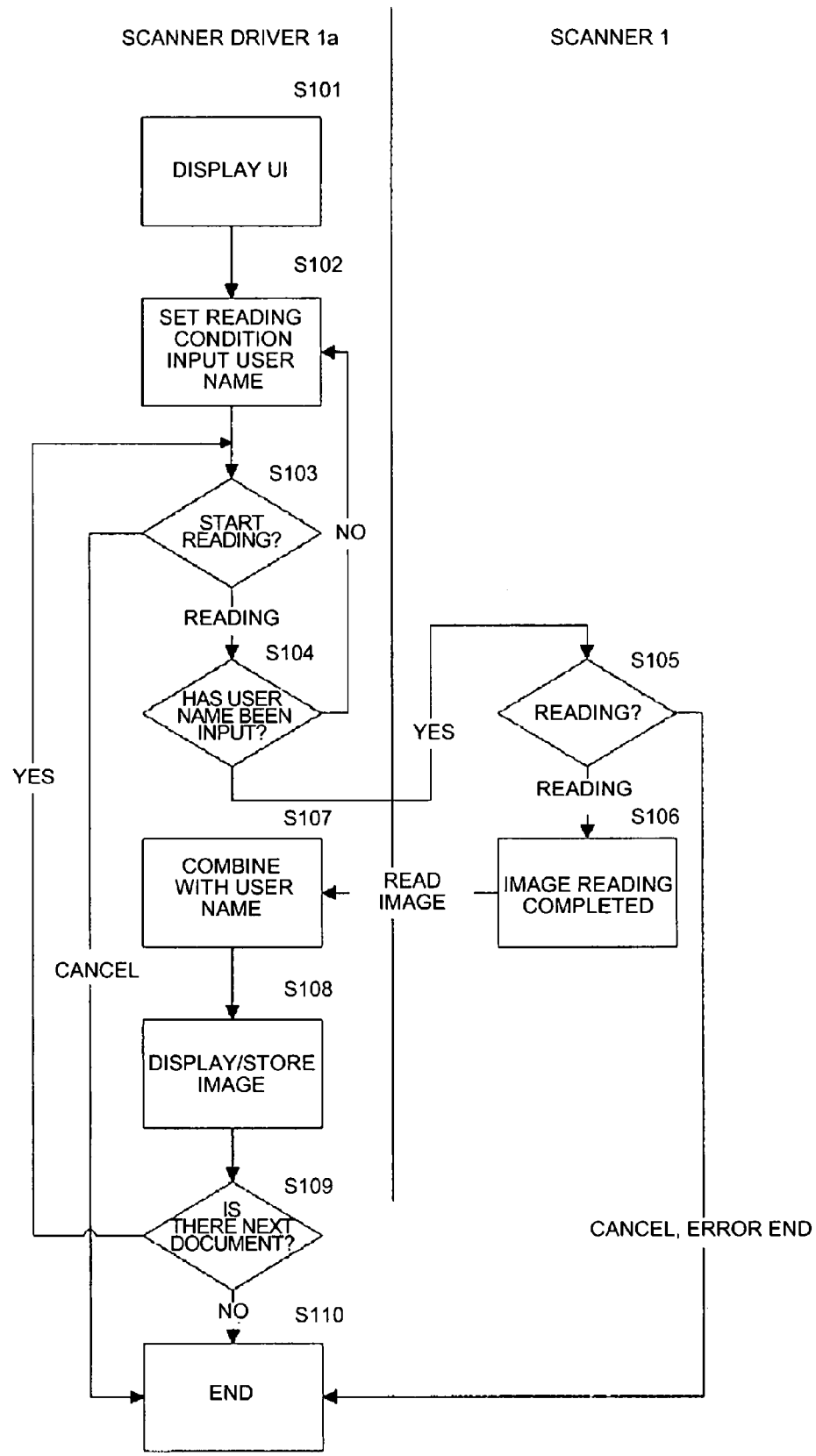
FIG. 2 is a flowchart of a process procedure according to the first embodiment.

When a user has read a document from an MFP having a scan function or from a scanner, to identify the person who has read the document, a user name set in advance is embedded into the read image, before the image read from the device is displayed by a scanner driver of the user PC or before the image is stored into a file. FIG. 2 is a flowchart of this process procedure. According to this process procedure, an image read by the scanner 1 is transmitted to the PC 2. Before the image is displayed in the application, a user name set in advance by the user is combined with the read image on the PC driver. The combined image is delivered to the application.

First, a user sets a document to be read to the scanner, and opens a screen of a scanner driver 1a from the PC 2 (step S101). The user inputs a reading condition and a user name to identify the user who reads the document, and starts reading the document (step S102). At the time of setting the reading condition on the scanner driver 1a, the user also inputs the own user name, and starts reading with the scanner 1. When a user name is not input, an error is displayed because it is not possible to identify the user. The reading cannot be started until when the user name is input (steps S102 and S103). When the reading has been performed correctly (steps S105 and S106), the scanner 1 transmits the image to the scanner driver 1a of the PC 2. The scanner driver 1a combines the image with the input user name (step S107), and displays the image on the screen or stores the image in a file (step S108). This operation is repeated for the entire document (step S109), and ends the process when there is no more document (step S110).

FIG. 3 is one example of a setting screen 2b on the display device 2a of the PC 2. In the setting screen 2b, there is provided an item 2c of a user name into which a user name is input to identify a user, in addition to a basic reading condition such as a reading size, resolution, and a color tone. When a user name specific to a user is input to the item 2c (step S102), the user name is combined with the read image.

FIGS. 4A and 4B depict a result of the process performed based on the flowchart shown in FIG. 2. When an original document 6a is as shown in FIG. 4A, a result of reading this document becomes as shown FIG. 4B which is a combination of the document and a user name 6c.

When a user reads a document and prepares a file using a scanner, the time of reading the document can be known from the file preparation time. However, there is no means to know who has read the document. However, according to the first embodiment, a user name input in advance is combined with the read image. Therefore, when this image is opened, the image can be confirmed as an image file input with the user who has read the image.

According to the first embodiment, a user can use a scanner without inputting a user name, or can use a user name that does not correctly identify the user. According to a second embodiment of the present invention, in using a scanner driver, a user registers a user name in advance. Only a user who has registered the user name can use the scanner. After reading the user name, this user name is combined with a read image. Therefore, according to the second embodiment, when a user who has registered a user name in advance inputs this user name and a password, the user can use a scanner driver. Other part names are the same as those used in the first embodiment, and redundant explanations will be omitted.

FIG. 5 is a flowchart of a process procedure of the second embodiment. A user first inputs a registered user name and a password (step S201). It is then determined whether the user is the registered user. When it is confirmed that the user is the registered user, the display device 2a performs a display, and the user can next go to a step of setting a scanner reading condition (step S203). After the user sets a reading condition, the user proceeds to a reading step (steps S204 and S205), and the scanner 1 transfers an image to the scanner driver. The scanner driver combines the image with the user name input by the user (step S206), and the user can display the image in the application or can store the image in a file (step S207). This operation is repeated to the end of the document (step S208), and the process ends when there is no more document (step S209).

Figure 6:
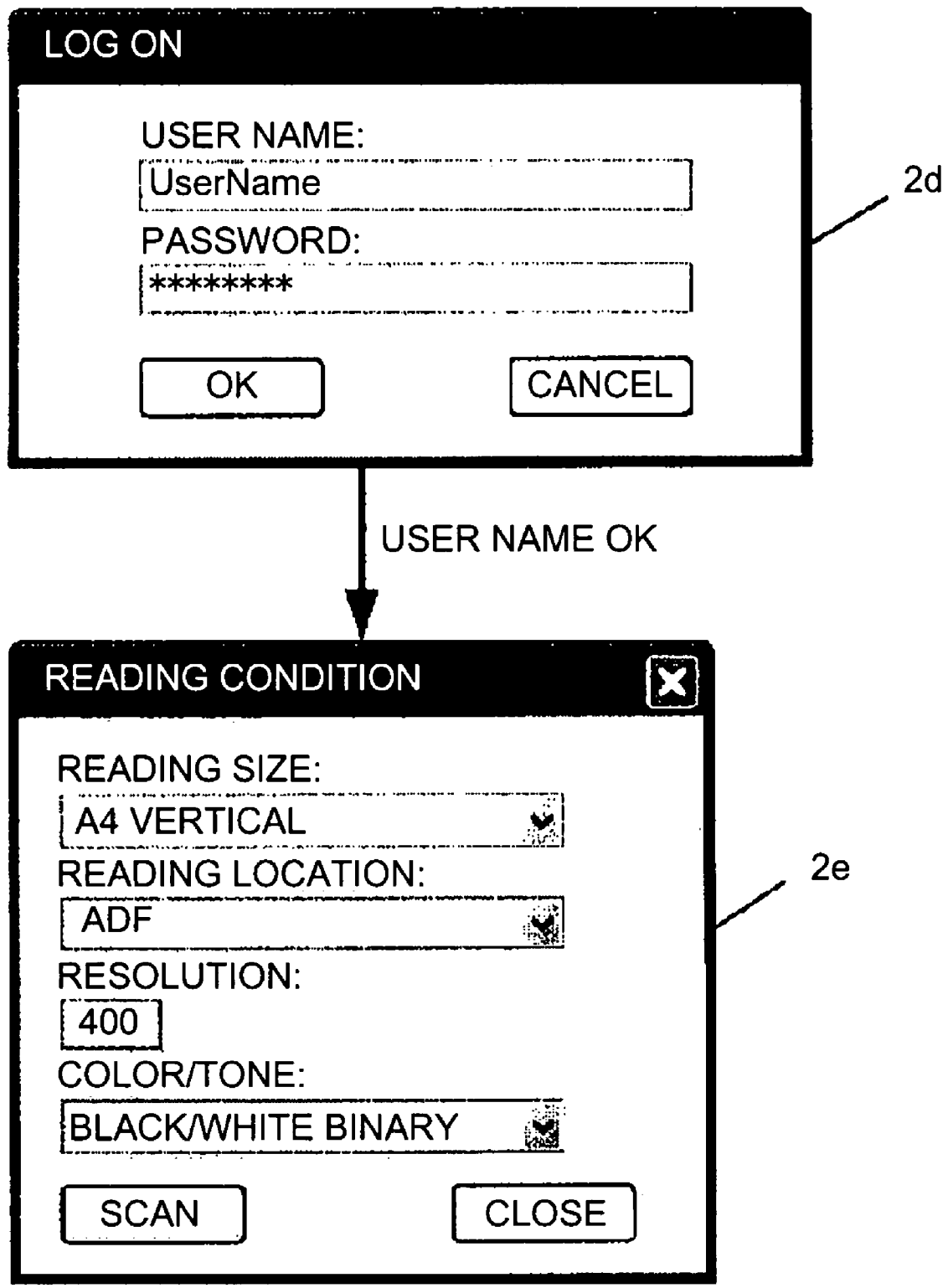
FIG. 6 is a display example of a user name input according to the second embodiment.

FIG. 6 is a display example of a user name input according to the second embodiment. A user inputs a registered user name and a password from a screen 2d for inputting a user name and a password. When the user is verified as a registered user, the user can proceed to a screen 2e for setting a reading condition. As for the output result, the original document 6a combined with the user name 6c at a predetermined position of the document is output as a scan image 6b, in the same manner as that according to the first embodiment.

Other unexplained parts in the second embodiment have configurations and functions equivalent to those of the first embodiment.

According to the second embodiment, a use cannot use a scanner unless the use inputs a user name registered in advance. Therefore, a user name remains on the image without exception. So long as this scanner is used, who has read the image becomes clear on the PC or the server.

According to the first and the second embodiments, in combining a user name at a predetermined position of a document image, it sometimes happens that characters are printed on a document to be read at the position where the user name is to be combined with the document image. When a user name is read into a document in advance, there is a risk that an input user name is superimposed on the user name on the image. In these cases, it is sufficient when an input user name can be combined with the image at an optional position of the image and in an optional size set in advance by the user.

Figure 7:
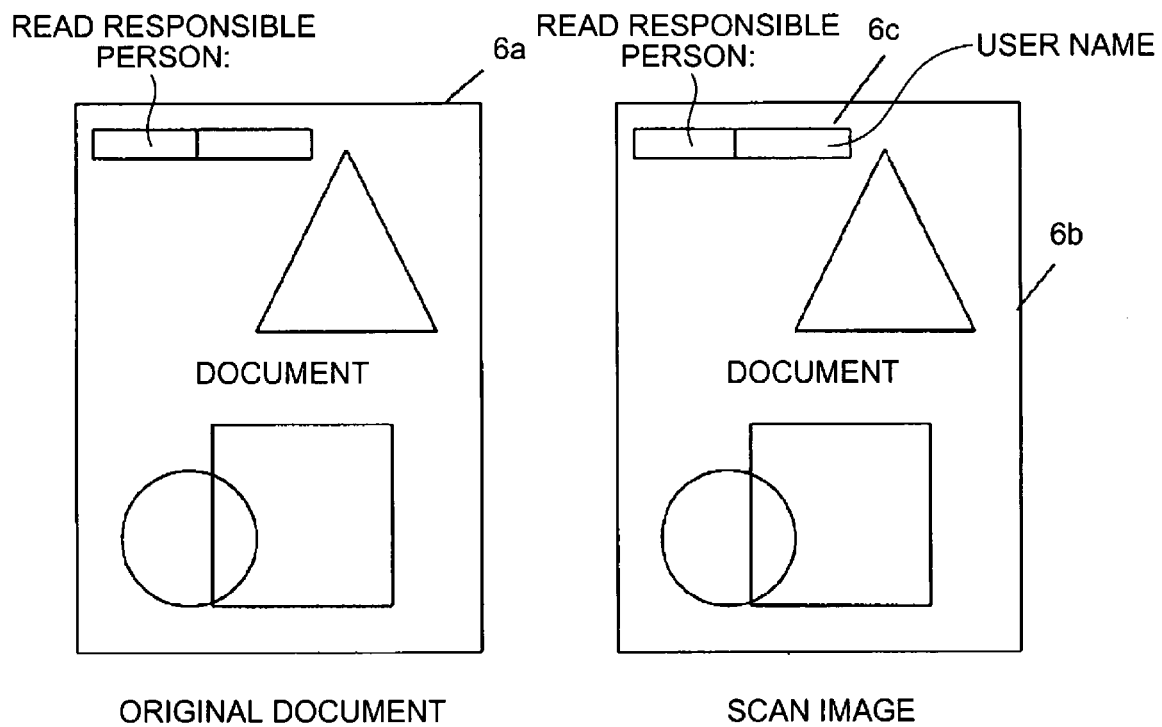
FIGS. 7A and 7B are examples of a document according to a third embodiment of the present invention having a column into which a user name is input.
Figure 7A:
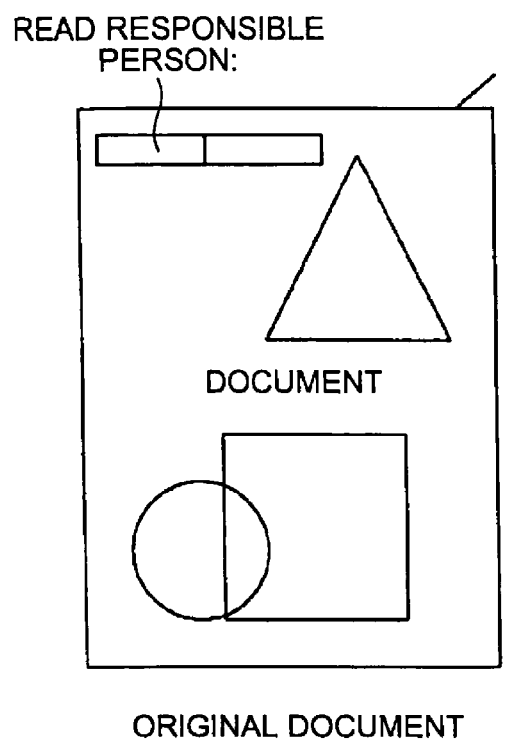
Figure 7B:
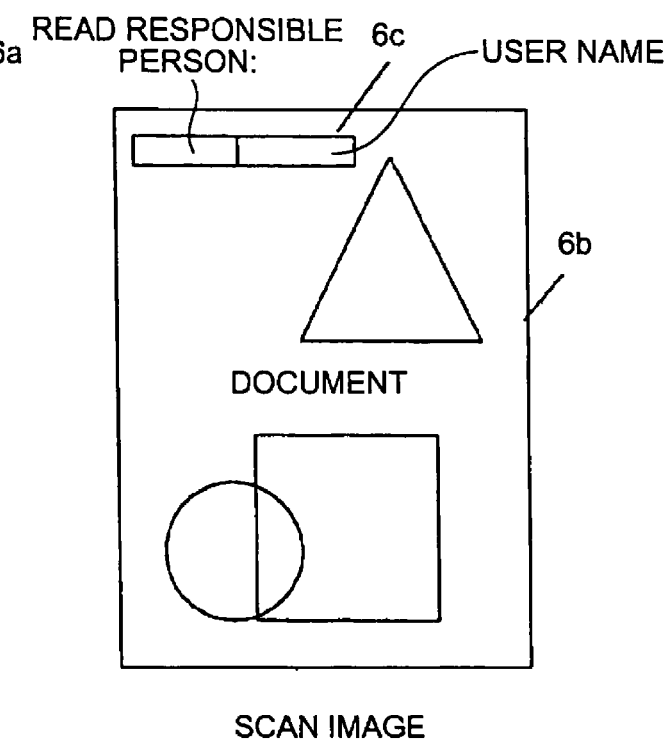
Figure 8:
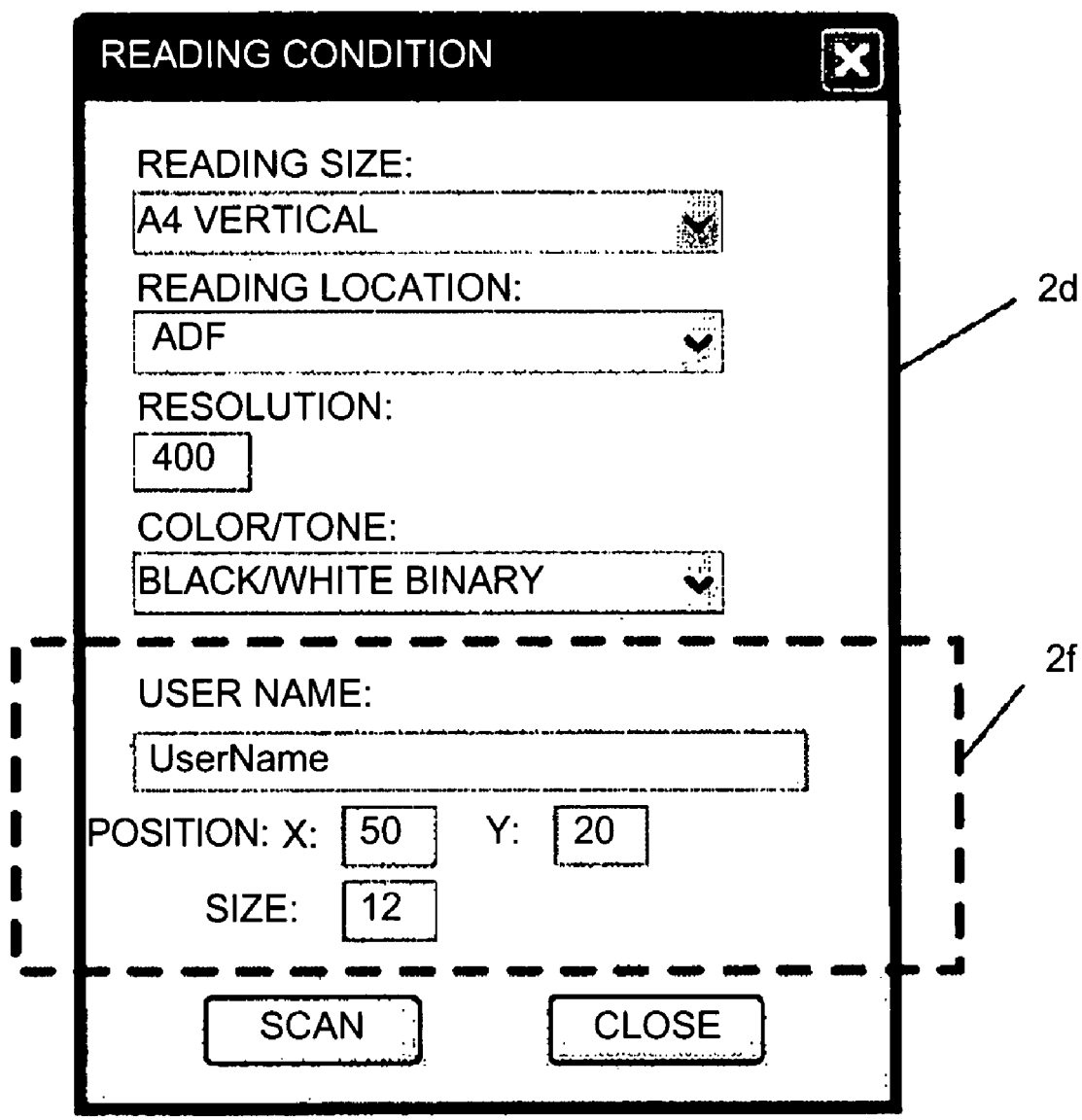
FIG. 8 is an example of a setting screen for reading and assigning a character combining position according to the third embodiment.

FIGS. 7A and 7B are examples of a document having a column into which a user name is input. When the document is read and when a position of the input column is matched, a read user name can be combined with a read image at a suitable position. FIG. 8 is an example of a setting screen for reading and assigning a character combining position. FIG. 8 depicts an item of inputting a position and a size of a user name, as indicated by 2f, in addition to the input item of a user name in the setting screen 2b shown in FIG. 3.

As explained above, when a position of the characters and a size of the characters to be combined are assigned in the setting screen 2b, these characters can be combined with the document image at a suitable position of the image.

Other unexplained parts in a third embodiment have configurations and functions equivalent to those of the first embodiment.

A user reads various kinds of documents, and some documents include characters in excess of the normal range of the paper. Therefore, there is a risk that when a user name is combined with a document image at a fixed position of the document, the user name is superimposed on the characters of the document. However, according to the third embodiment, a position and a size of characters to be combined can be changed in advance. Therefore, superimposition of the combined characters can be prevented.

According to the third embodiment, a combining position of a user name can be input using coordinate values, and a size of characters can be assigned. However, it is not necessarily possible to judge whether the characters can be input to a proper position of the actual image, when only a size of characters to be input is determined. According to a fourth embodiment of the present invention, when a user name is to be combined with a document image at a desired position of the document, this position can be easily assigned.

Figure 9:
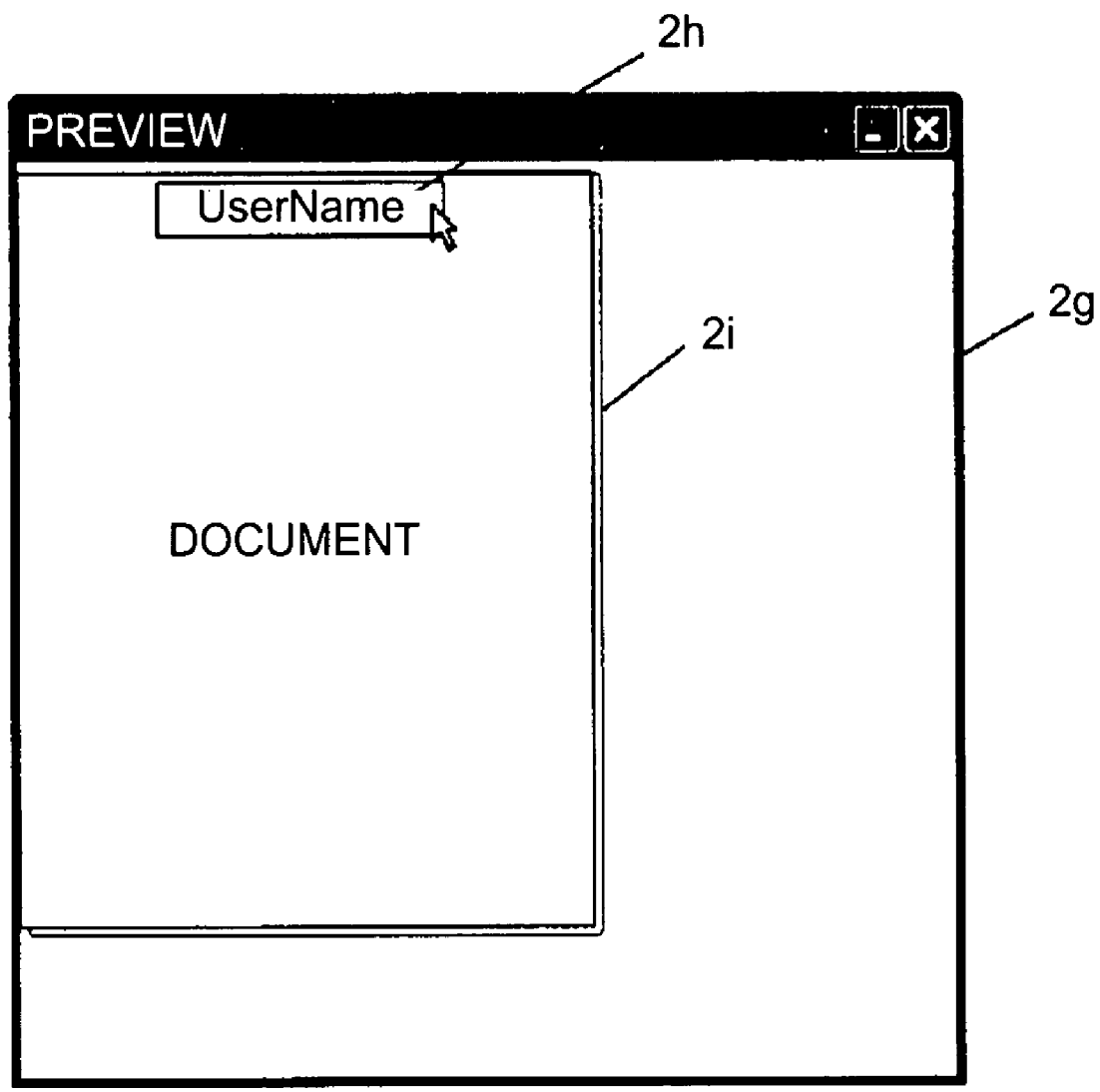
FIG. 9 is one example of a preview screen according to a fourth embodiment of the present invention.

According to the fourth embodiment, a preview is displayed after a document is once read. A user determines a combined position of the characters while looking at the preview. FIG. 9 is one example of a preview screen according to the fourth embodiment. By selecting a position 2h at which the user name is to be combined while looking at a preview 2g of the document, a user can set a position at which the characters are not superimposed on a document image 21.

Other unexplained parts in the fourth embodiment have configurations and functions equivalent to those of the first embodiment.

When a user assigns a combining position, the user needs to allocate a position of characters to be combined after measuring the size of the document. However, according to the fourth embodiment, a preview is displayed after once rescanning the document. Therefore, the user can select a position at which the user name is to be combined while watching the image of the document.

Figure 10:
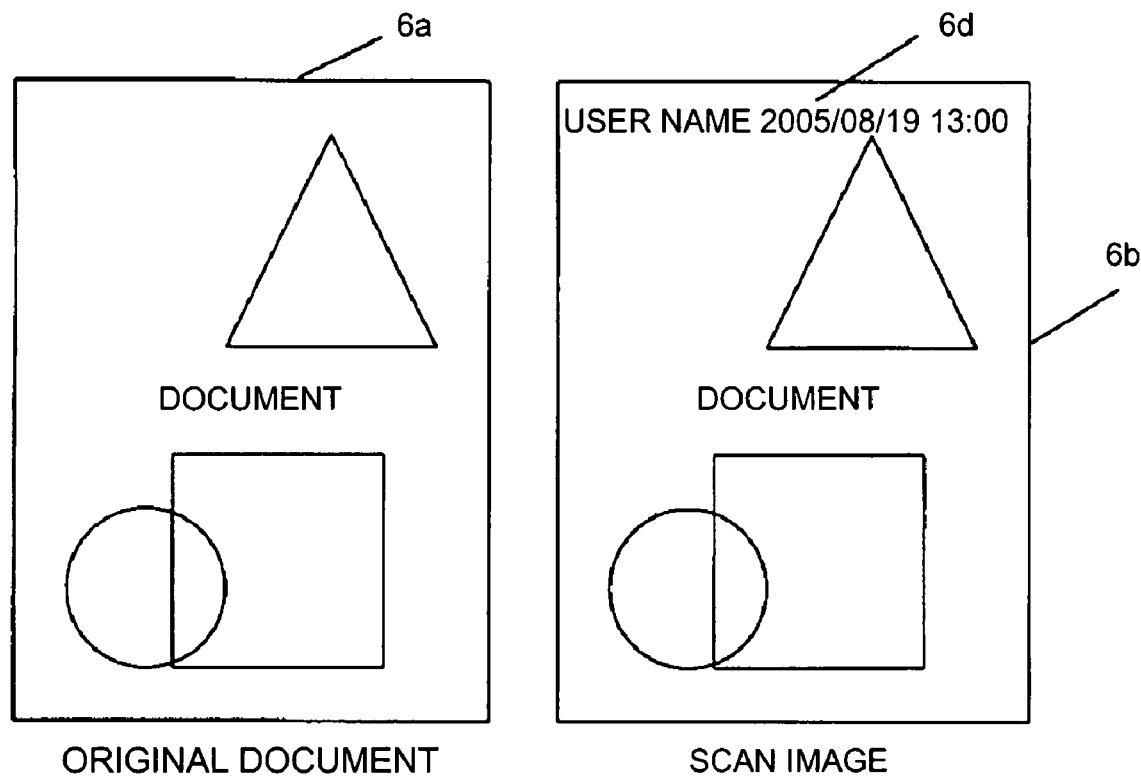
FIGS. 10A and 10B depict an original document and a scan image according to a fifth embodiment of the present invention in comparison.

Usually, when an image is read from the scanner 1, it can be considered that a file preparation time is the time when the image is read from the scanner 1. However, this cannot be confirmed in a state that the image is displayed. Even when an image is read, a file preparation time is not recorded when the image is not stored in a file. According to a fifth embodiment of the present invention, a user name and a date and time of reading an image are simultaneously combined on the image. With this arrangement, the user who has read the image and the date and time of reading the image can be confirmed at the same time. FIGS. 10A and 10B depict the original document 6a and the scan image 6b in comparison. An image 6d obtained by combining the user name according to the first embodiment and the date and time of reading the image is output.

Other unexplained parts in the fifth embodiment have configurations and functions equivalent to those of the first embodiment.

When an image of a document read by using a scanner is saved in a file, the date and time of preparing this file remain. However, the date and time of reading the image cannot be known. According to the fifth embodiment, because both the user name and the date and time of reading the image are combined with the image, the information of the image reader and the image reading time can be saved.

According to the first to the fifth embodiments, a user inputs a user name or inputs a registered user name, and uses a scanner driver. However, because the object of the invention is to identify a user who has read the image, the above methods according to the first to the fifth embodiments do not necessarily guarantee that the input user is the user who has actually read the image. Because it is sufficient to be able to identify the user who has read the image, according to a sixth embodiment of the present invention, a user name logged on in the operating system (OS) of each PC is used to perform a similar identification. In the sixth embodiment, a read document is combined with a name logged on in the OS instead of the user name, thereby identifying the user. With this arrangement, a user does not need to input a user name.

FIG. 11 is a flowchart of a process procedure of a scanner, an OS, a scanner driver, and scanner hardware that perform the above operations according to the sixth embodiment. A user logs on in the OS of the PC (steps S301 and S302), and starts the scanner driver 1a from the application (steps S303 and S304). The user assigns a reading condition, and reads an image with the scanner 1 (step S305). The image read from the scanner 1 is transmitted to the scanner driver 1a. The scanner driver 1a obtains the current user name from the OS (step S306). The user name is combined with the read image, and the combined result is output (steps S307 and S308). When the above processing is performed, the user name that is read is automatically output as an image.

According to the sixth embodiment, although a user does not input a user name, the person who has read the document can be identified. A person cannot be easily identified from a user name. However, when each person operates one PC without sharing it with other persons, a computer name of this PC can be used. With this arrangement, any person can know a PC from which an image has been read. In this case, instead of obtaining a log-on user name at step S306, a computer name is obtained from the OS. The obtained computer name is combined with the document image, and the combined result is output.

Other unexplained parts in the sixth embodiment have configurations and functions equivalent to those of the first embodiment.

As described above, according to the sixth embodiment, as a method of identifying a user, a user name used to log on in the OS of a PC is used, or a PC name specific to the PC is used, to identify the user. Therefore, the user does not need to input the user name.

Figure 12:
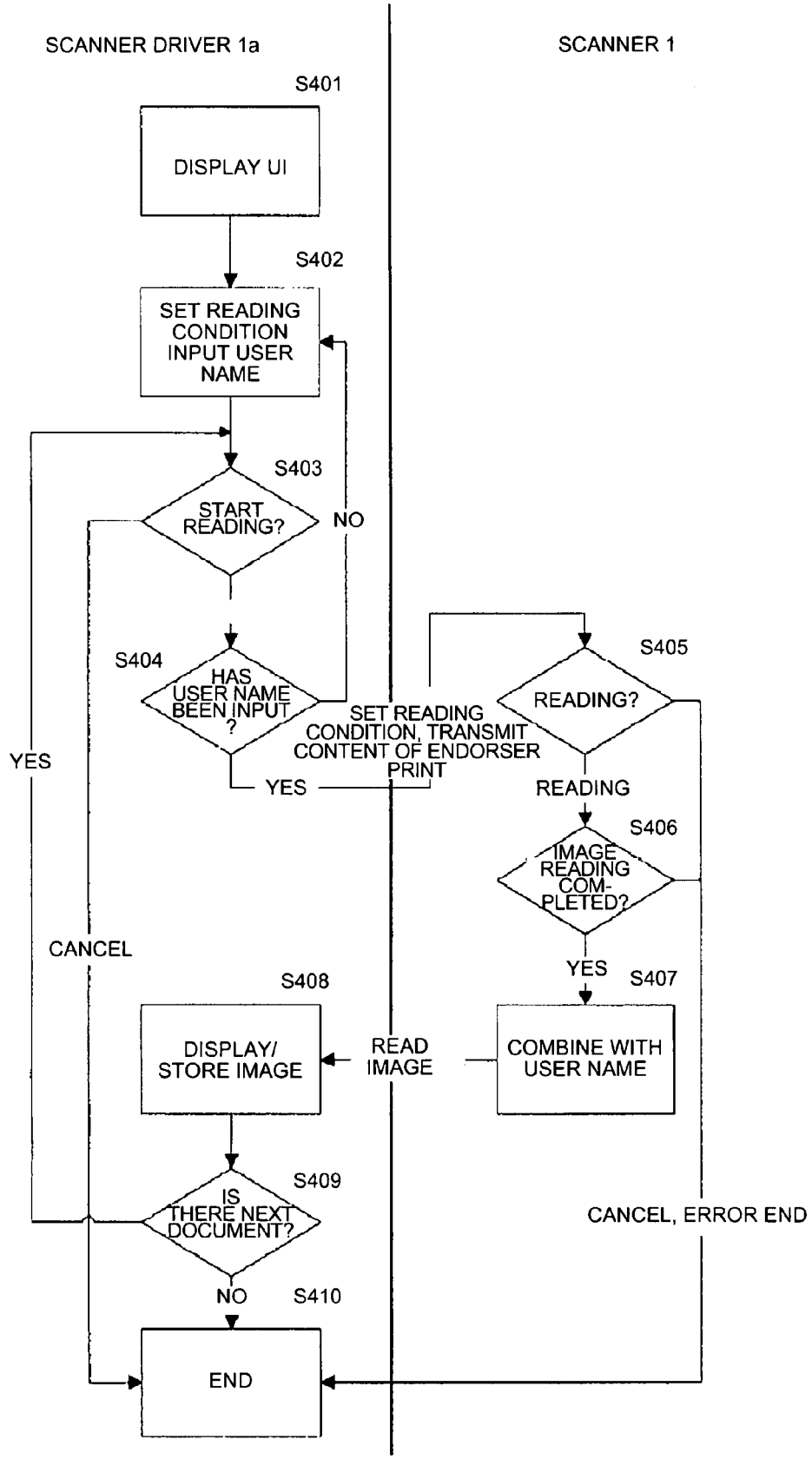
FIG. 12 is a flowchart of a process procedure according to a seventh embodiment of the present invention.

According to the first to the sixth embodiments, the scanner driver 1a has the function of printing a user name onto the read image. According to a seventh embodiment of the present invention, information to be combined with a document, such as a user name, is collected on the scanner driver 1a. This information is transmitted to the scanner 1 together with a reading condition. The scanner 1 reads the image, and then combines characters such as the user name with the image. The image combined with the user name is transmitted to the scanner driver 1a. FIG. 12 is a flowchart of a process procedure according to the seventh embodiment.

As shown in FIG. 12, a user displays a display screen, sets a reading condition, and inputs a user name from the PC (steps S401 and S402). Reading of a document is started (step S403), and the input of the user name is confirmed (step S404). The scanner 1 reads a document image (step S405). When the document image has been read correctly (step S406), the scanner 1 combines the read image with the user name (step S407). The read image combined with the user name is transmitted to the PC driver. The PC driver displays the transmitted image or saves the image (step S408). This operation is repeated to the end of the document (steps S409 and S410). In this way, the user name is combined with all the read document images.

Other unexplained parts in the seventh embodiment have configurations and functions equivalent to those of the first embodiment.

According to the seventh embodiment, while the read image itself is not different from that according to the first embodiment, characters of a user name are already combined with the image when the image is output from the scanner 11. Therefore, when a user unjustly reads an image from a network, it becomes possible to identify the user. When the scanner 1 has a function of storing a backup of the read image, the read image is already combined with the user name. Therefore, the user can be identified thereafter.

Figure 13:
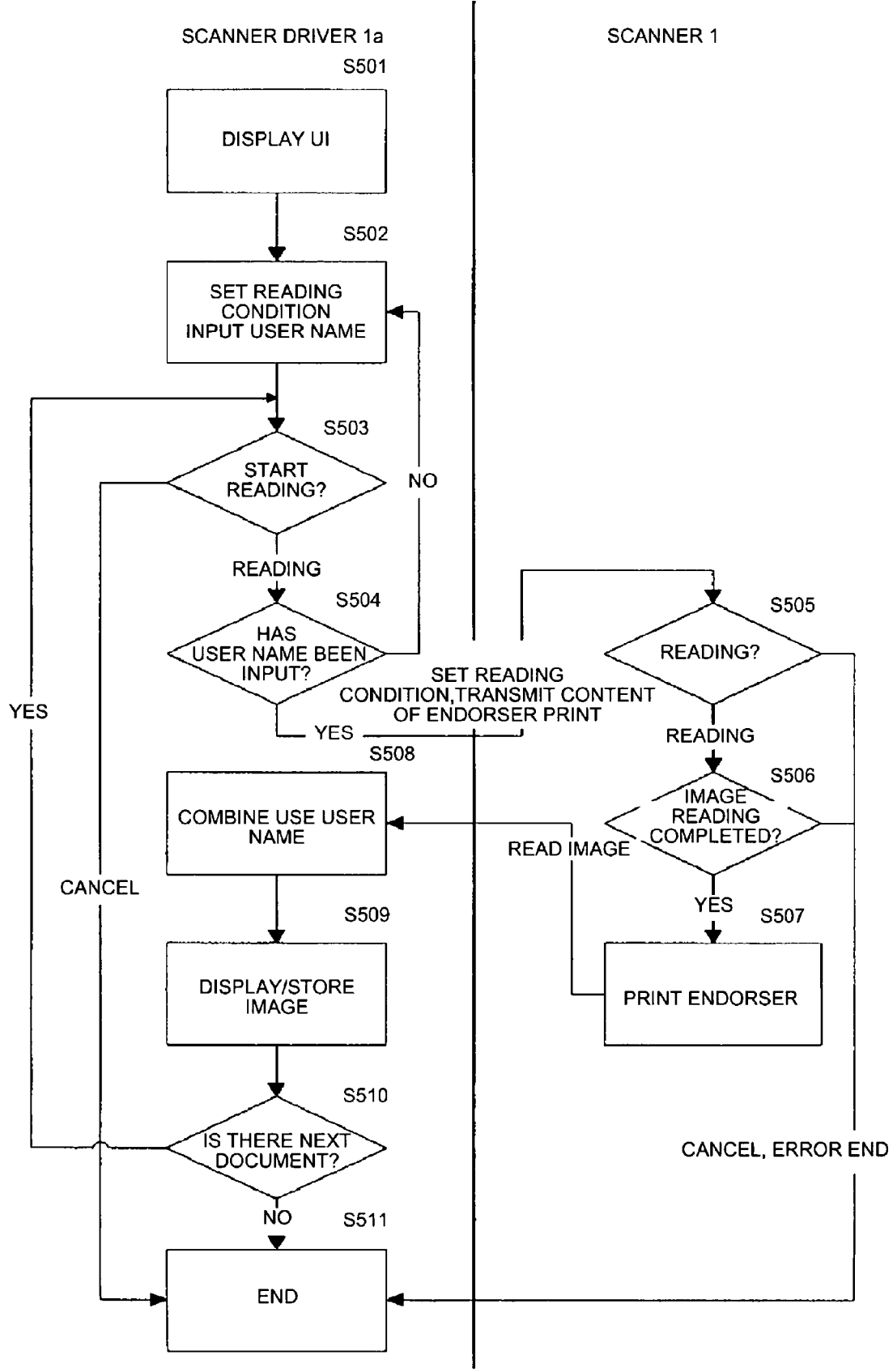
FIG. 13 is a flowchart of a process procedure according to an eighth embodiment of the present invention.
Figure 15:
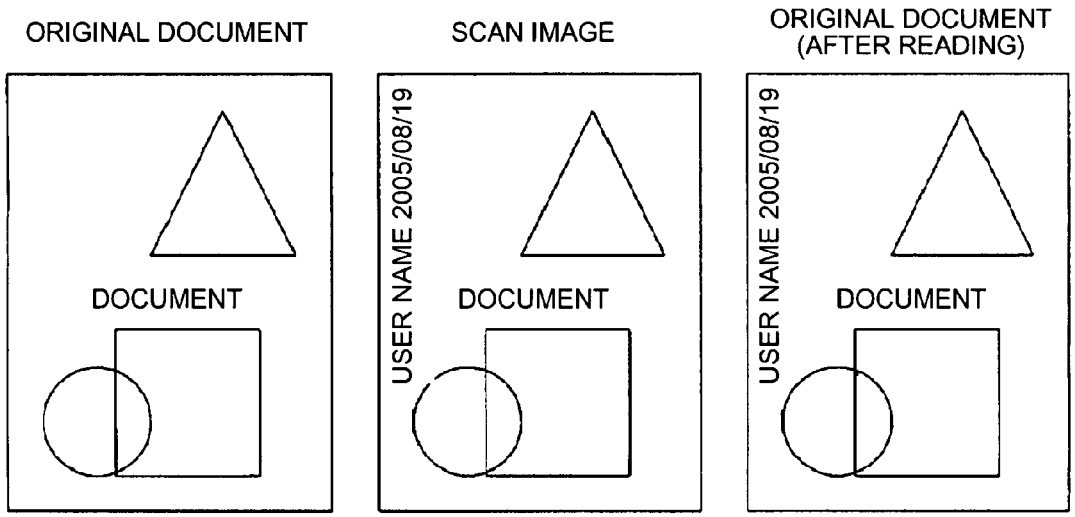
FIGS. 15A to 15C depict other states of the document, the scan image, and the document after reading according to the eighth embodiment.

In general, an endorser (stamp) function is available to determine that an image has been read from a scanner when the image has been read from the scanner. According to an eighth embodiment of the present invention, a scanner has this endorser function, and a function of combining a user name with the read image. FIG. 13 is a flowchart of a process procedure according to the eighth embodiment.

As shown in FIG. 13, a user assigns a reading condition and a user name with a scanner driver of a PC (steps S501 and S502), and executes a reading (step S503). The scanner driver sets the reading condition and the input characters of a user name to be printed as the endorser, to the scanner 1 (step S504). The scanner 1 reads an image in the set reading condition (step S505). When the image has been read correctly (step S506), the set characters of the endorser are printed on the image (step S507). The read image is transmitted to the scanner driver. The scanner driver combines the user name with the document image (step S508). As a result, the user name is displayed on both the document image printed with the user name as the endorser and the image obtained by combining the user name with the read image (step S509). With this arrangement, a person who has read the document can be identified from both images. This processing is repeated to the end of the document (step S510). After the above processing is performed to the whole document, the processing ends (step S511).

Figure 14:
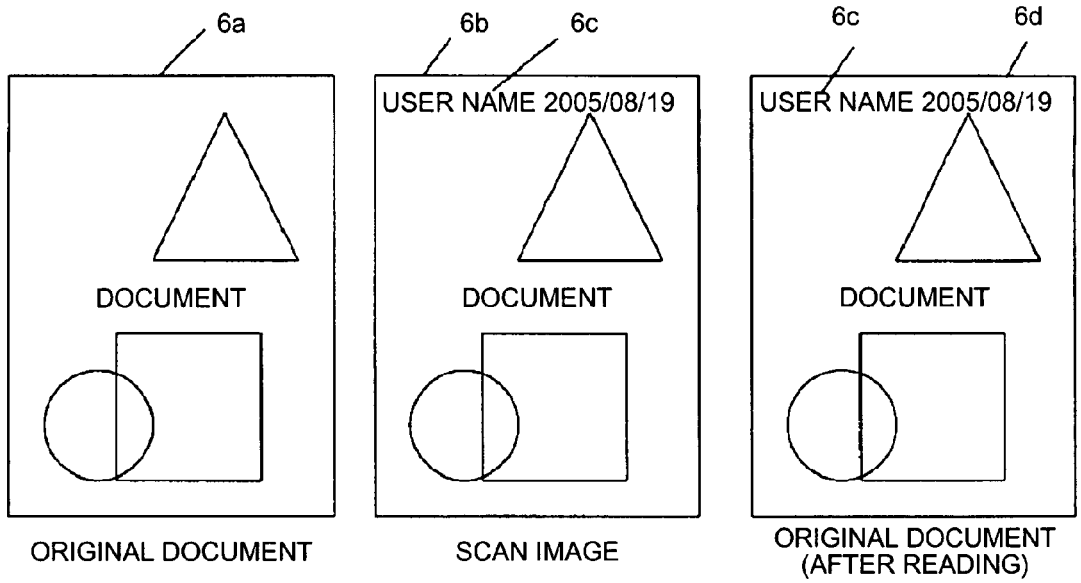
FIGS. 14A to 14C depict states of a document, a scan image, and a document after reading according to the eighth embodiment.
Figure 14A:
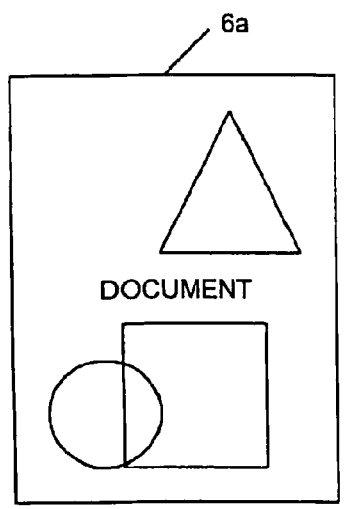
Figure 14B:
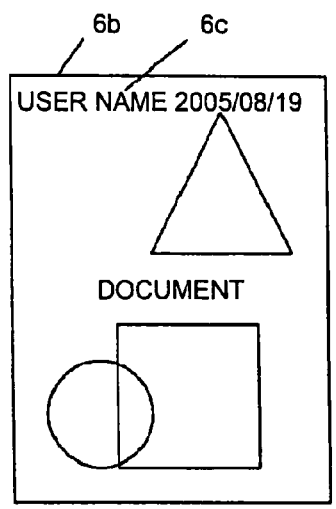
Figure 14C:
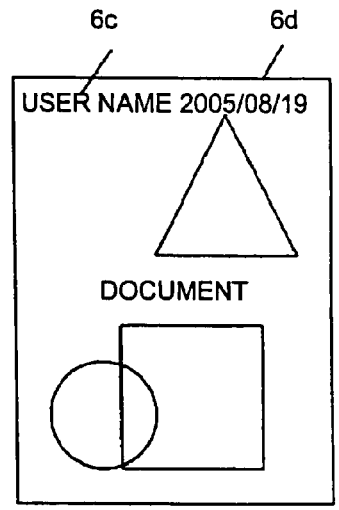

FIGS. 14A to 14C depict states of the original document 6a, the scan image 6b, and the image 6d after the reading. Based on the processing according to the eighth embodiment, the user name is combined with the scan image 6b and is also combined with the original document after the reading (in this example, the reading date is also combined with the images), and the combined images are output. Therefore, a person who has read the image can be specified by merely looking at the document.

Figure 15A:
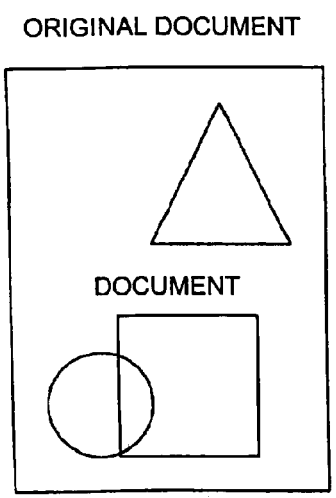
Figure 15B:
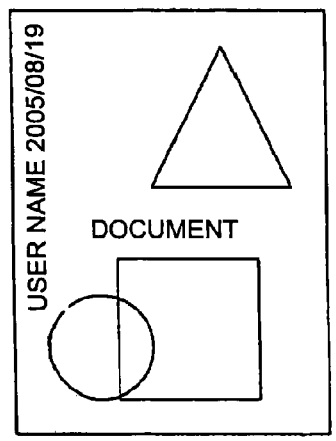
Figure 15C:
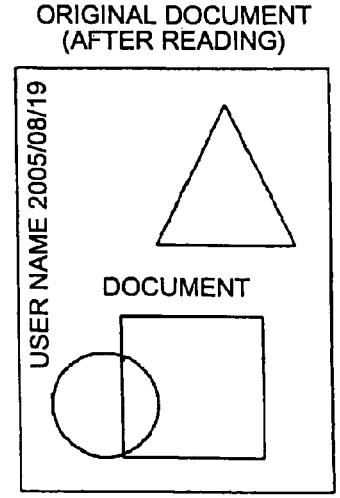

While the user name 6c is output at an upper side of the drawing in the example shown in FIGS. 14A to 14C, the scanner also has an endorser print function capable of printing the user name at an arbitrary position in a main scanning direction or a sub-scanning direction. The scanner 1 capable of freely printing the endorser in a main scanning direction or a sub-scanning direction can print the user name 6c on the image 6d at the same position as that of the scanner print position in the same direction and in the same size as those of the scanner printing. With this arrangement, the read image 6b can be set to exactly the same state as that of the image 6d after the reading. FIGS. 15A to 15C depict a relationship between the original document 6a, the scan image 6b, and the image 6d after the reading. As shown in FIGS. 15A to 15C, even when the endorser printing direction is a main scanning direction, the direction of the characters can be matched to prepare the same image. Accordingly, the original document and the read image can be confirmed easily.

Other unexplained parts in the eighth embodiment have configurations and functions equivalent to those of the first embodiment.

According to the eighth embodiment, a user who has read the image and a date and time can be printed on both the read image and the original document. Therefore, at the time of a continuous reading in the operation, a person who has read the image can be confirmed from both the document and the read image.

When the scanner can print an endorser (stamp) at an arbitrary position in a main scanning direction or a sub-scanning direction of a document, the endorser can be printed at the same position as that of the document, and characters of a user name can be combined with the image in the same format. Therefore, the original document and the read image can be confirmed easily.

A reading unit in the appended claims corresponds to the scanner 1, a read control unit in the claims corresponds to the scanner driver 1a, an information processing terminal in the claims corresponds to the PC 2, and a display unit in the claims corresponds to the display device 2a, respectively in the above embodiments.

As described above, according to one aspect of the present invention, the reading unit transmits a read image to the information processing terminal. The information processing terminal combines a user name set in advance by a user with the read image on the read control unit before displaying the image on the display unit, and transfers the combined image to the display unit. Therefore, a person who has read the image can be easily identified from the image combined with the user name and displayed on the display unit.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading device comprising:
a reading unit that reads image data from an image; and
an information processing terminal that is connected to the reading unit, the information processing terminal including a read control unit that controls the reading unit, wherein
the reading unit transmits the image data to the information processing terminal, and
the information processing terminal combines a user name set in advance by a user with the image on the read control unit, and transfers the image combined with the user name to a display unit to display the image,
wherein the read control unit enables a pre-registered user to use the reading unit, and combines a user name of a user who actually used the reading unit with the image.

2. The image reading device according to claim 1, wherein the read control unit combines the user name with the image at least one of at a position of the image and in a size, set in advance by the user.

3. The image reading device according to claim 1, wherein the read control unit displays a preview screen of a document image before combining with the user name, and combines the user name with the document image at a position selected on the preview screen.

4. The image reading device according to claim 2, wherein the read control unit displays a preview screen of a document image before combining with the user name, and combines the user name with the document image at a position selected on the preview screen.

5. The image reading device according to claim 1, wherein a date and time of reading the image is further combined together with the user name.

6. The image reading device according to claim 1, wherein the user name is a log-in user name used when the user logs in the information processing terminal.

7. The image reading device according to claim 6, wherein the log-in user name is obtained from an operating system.

8. The image reading device according to claim 1, wherein
the read control unit collects a character string that is required to be combined, including at least one of a user name, a log-in name, and a personal computer name, and transmits the character string to the reading unit together with a reading set value, and
the reading unit reads the image data based on the reading set value, combines the character string with the image, and transmits the image combined with the character string to the read control unit.

9. The image reading device according to claim 8, wherein the character string is printed on both a read document image and an original document.

10. The image reading device according to claim 9, further comprising an endorsing unit that prints an endorser at an arbitrary position of the document image in a main scanning direction or a sub-scanning direction, wherein
the character string is printed at a same position with a same size in a same direction as the endorser.

11. The image reading device according to claim 1, wherein the read control unit includes a scanner driver loaded on the information processing terminal.

12. A Non-Transitory computer-usable medium having computer readable program codes embodied in the medium that when executed cause a computer to execute:
setting a reading condition for reading a document;
determining whether an inputted user name is a pre-registered user name;
causing a reading unit to start reading the document when the user name is input and when the inputted user name corresponds to the pre-registered user name;
causing a read control unit to combine the user name with a read image of the document transferred from the reading unit; and
displaying an image combined with the pre-registered user name at the combining.

13. The non-transitory computer-usable medium according to claim 12, wherein the computer-readable program codes further causes the computer to execute storing read image data of the document transferred from the reading unit.

14. A Non-Transitory computer-usable medium having computer readable program codes embodied in the medium that when executed cause a computer to execute:
determining whether an inputted user name corresponds to a pre-registered user name;
setting a reading condition for reading a document;
causing a reading unit to start reading the document;
causing a read control unit to combine the user name with a read image of the document transferred from the reading unit; and
displaying an image combined with the user name at the combining.

15. The non-transitory computer-usable medium according to claim 14, wherein the computer-readable program codes further causes the computer to execute storing read image data of the document transferred from the reading unit.

* * * * *